US012607872B2

(12) United States Patent
Giazzon et al.

(10) Patent No.: US 12,607,872 B2
(45) Date of Patent: Apr. 21, 2026

(54) PROTECTIVE CAP FOR SURFACE TREATMENTS ON EYEGLASS FRAME PORTIONS AND METHOD FOR THE SURFACE TREATMENT OF AN EYEGLASS FRAME PORTION

(71) Applicant: THÉLIOS S.P.A., Longarone (IT)

(72) Inventors: Nicola Giazzon, Santa Giustina (IT); Manuel Giazzon, Borgo Valbelluna (IT); Luca Landini, Montecatini Terme (IT); Francesco Sandias, Montecatini Terme (IT); Lucía Gabriela Pérez Amaro, Montecatini Terme (IT); Tommaso Guazzini, Montecatini Terme (IT)

(73) Assignee: THÉLIOS S.P.A., Longarone (IT)

( * ) Notice: Subject to any disclaimer, the term of this patent is extended or adjusted under 35 U.S.C. 154(b) by 368 days.

(21) Appl. No.: 18/129,914

(22) Filed: Apr. 3, 2023

(65) Prior Publication Data

US 2023/0314834 A1     Oct. 5, 2023

(30) Foreign Application Priority Data

Apr. 1, 2022     (IT) ........................ 102022000006500

(51) Int. Cl.
G02C 5/22               (2006.01)
(52) U.S. Cl.
CPC .................................... G02C 5/22 (2013.01)

(58) Field of Classification Search
CPC ........ G02C 5/22; G02C 13/001; B29D 12/02; B24B 1/00; B24B 55/00
See application file for complete search history.

(56) References Cited

FOREIGN PATENT DOCUMENTS

| DE | 19955097 A1 | 5/2001 |
| FR | 2465580 A1 | 3/1981 |
| WO | 2014020460 A1 | 2/2014 |

OTHER PUBLICATIONS

European Search Report for EP 23165954 Completed Jul. 28, 2023.
Italian Search Report for IT 102022000006500 Completed Oct. 20, 2022.

*Primary Examiner* — Tuyen Tra
(74) *Attorney, Agent, or Firm* — Rivka Friedman

(57) ABSTRACT

Protective cap for surface treatments on eyeglass frame portions, including a first protection element provided with a first coupling portion and intended to be mounted to cover a hinge element of the frame, and a second protection element, which is provided with a second coupling portion mechanically and removably connected to the first coupling portion and intended to be mounted to cover a surface area of the frame portion. The first coupling portion is made of a first polymer material provided with a first swelling, and the second coupling portion is made of a second polymer material provided with a second swelling greater than the first swelling. Furthermore, the second protection element is intended to separate from the first protection element due to the differentiated swelling following the absorption of a rinsing fluid.

12 Claims, 5 Drawing Sheets

Rinsing fluid

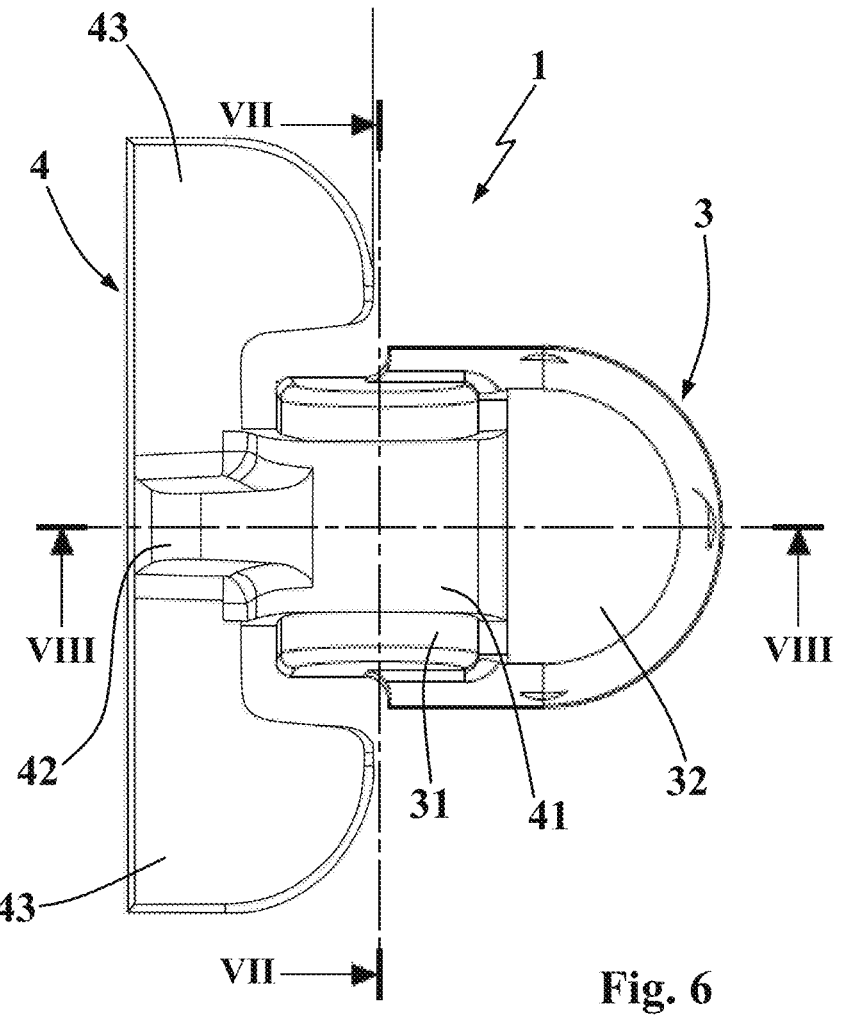
Fig. 6
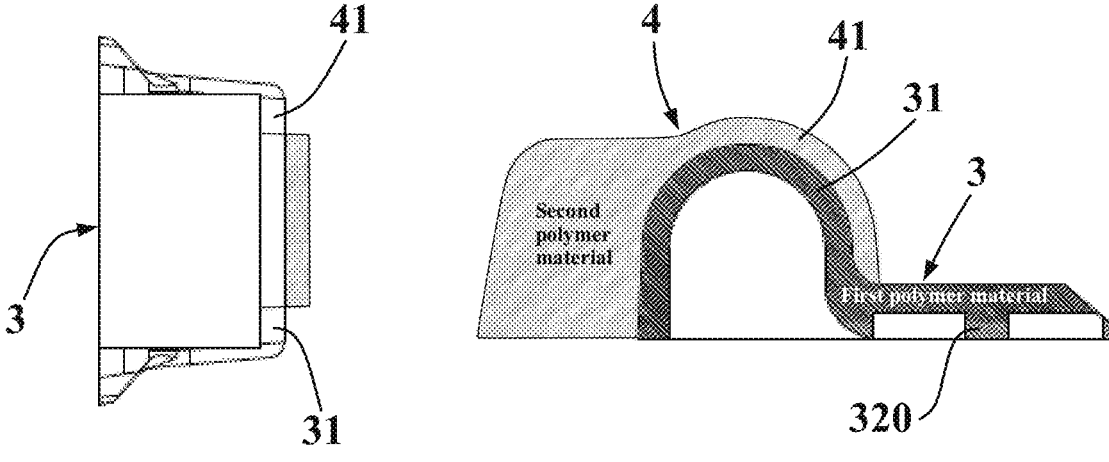
Fig. 7                                    Fig. 8

PROTECTIVE CAP FOR SURFACE TREATMENTS ON EYEGLASS FRAME PORTIONS AND METHOD FOR THE SURFACE TREATMENT OF AN EYEGLASS FRAME PORTION

FIELD OF APPLICATION

The present invention relates to a protective cap for surface treatments on eyeglass frame portions and to a method for the surface treatment of an eyeglass frame portion.

The protective cap in question is advantageously intended to be associated with an eyeglass frame portion to protect it during surface treatments such as for example finishing operations.

More particularly, the protective cap in question is advantageously intended to be associated with the front and with a hinge element of an eyeglass frame to advantageously protect them during the tumbling and smoothing operations.

Therefore, the protective cap and the method object of the present invention relate to the industrial sector of eyewear, and in particular to the industrial sector of the production of components for the finishing processes of eyeglass frames.

BACKGROUND ART

Protective caps for protecting eyeglass components during surface finishing treatments, such as for example tumbling and polishing, are known on the market. These protective caps are also known in technical jargon with the term "tumbling caps", and have the function of protecting the most delicate components of an eyeglass frame during these finishing operations. In more detail, these protective caps are usually associated with a frame, which is usually made of acetate and comprises a front and two temples, which are hinged to the front, at respective lateral portions called in the technical jargon of the sector by the name of "heels". Generally, the temples are hinged to the front by means of a pair of hinges, each comprising two hinge elements, of which a first hinge element is fixed to the front and a second hinge element is fixed to the corresponding temple.

In general, during the production step of acetate frames, the front and temples are made using mechanical processes which do not allow obtaining a smooth and regular surface to the touch. In fact, these mechanical processes provide for obtaining frames with a high surface irregularity and usually generate numerous processing burrs on the outer surface of the frame.

Therefore, in order to remove burrs and irregularities on the external surface of the components to be assembled, the front and temples are subjected to finishing treatments. These finishing operations usually include two distinct surface treatments, which involve the use of distinct abrasive agents, and are interspersed with a rinsing step to remove the abrasive agents and clean the external surface of the front and temples in view of the second finishing treatment. More in detail, the first surface treatment, known as tumbling, is of the coarse type and usually uses coarse abrasive agents immersed in oil, while the second surface treatment, known as polishing or smoothing, is a finishing treatment which uses agents with reduced abrasive power.

The front and the temples of the frame have portions which need more precise dimensional tolerances than the other portions of the frame and must be protected during the finishing operations, in order to prevent abrasive agents from coming into contact with them and remove a quantity of material or cause scratches or defects.

For example, a portion that cannot be tumbling is the heel (i.e., the lateral end portion) of the front. In fact, the heel is arranged opposite the end portion of the temple, when the latter is hinged to the front and placed in an open position, and must be arranged parallel and flush with it, avoiding misalignments or excessive play, which are perceived by the end user as defects. Therefore, the heel of the front requires a high dimensional tolerance and cannot be excessively abraded during the finishing steps. Therefore, the heel of the front must necessarily be protected during the tumbling step, in order to avoid excessive dimensional variations due to abrasion, while it must be subjected to the final polishing or smoothing treatment, in order to make the external surface of the heel smooth and homogeneous like the remaining portions of the acetate frame, so as to give the whole frame the same degree of roughness.

Further portions of the frame which must be protected during the finishing operations are the hinge elements fixed to the front (at the heel) and to the temples. In fact, the hinge elements are finished (in particular polished and galvanized) before being fixed to the acetate frame. Therefore, the steps for finishing the acetate frame, taking place after the step for finishing the metal hinges, would risk damaging the hinge elements themselves. The metal hinges must therefore be protected during all the finishing steps of the frame, i.e. both during the tumbling step and during the subsequent polishing or smoothing step.

To this end, it is therefore known to use protective caps associated with the above-described portions of the frame, or in particular with the heel and the hinges, before the finishing operations. In order to selectively protect the heel of the front and the hinge elements, it is known to apply, during the first tumbling step, a protective cap of greater width, i.e. arranged to protect at the same time the heel of the front and the hinge element associated with it, and, during the second polishing or smoothing step, a protective cap of smaller width, i.e. arranged to protect the hinge element only, leaving the heel of the front uncovered.

This protective cap solution described above has proved to be not free from drawbacks in practice.

A first drawback lies in the fact that two separate protective caps are required to be applied at different times to the eyeglass frame.

Furthermore, a further drawback lies in the fact that the replacement of the protective caps is performed manually by an operator, thus resulting slow and expensive with a consequent increase in costs.

In order to solve the aforementioned drawbacks of the prior art, a protective hood solution has been developed, described in patent IT 102012902073149, comprising a first protection element placed to protect the metal hinge, and a second protection element placed to protect the heel of the front and connected to the first protection element. The aforementioned patent provides that the first protection element is resistant to a rinsing fluid (usually water) and the second protection element is soluble in contact with such rinsing fluid.

In this way, during the tumbling step, the second protection element is placed to cover the heel of the front piece and the first protection element is placed to cover the hinge element, so that the abrasive agents used do not come into contact with both portions of the frame. Following the aforesaid tumbling step, the rinsing step is instead carried out which is adapted to eliminate the abrasive agents and the oil which remained adhered to the surface of the frame during tumbling. Therefore, in this rinsing step, the second protection element is solubilized in contact with the rinsing fluid. In this way it is therefore possible to proceed to the polishing or smoothing step, with only the first protection element mounted, without manually removing the second protection element. In practice, this solution described above has also proved to be not free from drawbacks. The main drawback of the protective cap described above lies in the fact that over time, the rinsing fluid loses efficiency in solubilizing the second protection element and has difficulties in maintenance and replacement. In fact, by increasing the number of frames subjected to rinsing, large quantities of the soluble material used to make the second protection element are solubilized and the rinsing fluid becomes saturated therewith. As saturation increases, soluble material is much more difficult to dissolve and replacement of the rinsing fluid is therefore required.

Due to this drawback, it may also occur that, in the absence of replacement of the saturated rinsing fluid, the cap is not solubilized, remaining to cover the heel of the front piece. The latter therefore risks not being subjected to the subsequent polishing step, generating an aesthetic defect in the eyewear.

A further drawback lies in the fact that the solution may have, depending on the soluble material used to make the second protection element, a high environmental impact, resulting in conflict with current regulations regarding the reuse and disposal of the rinsing fluid and the protection elements. In fact, following the solubilization of the second protection element, the latter pollutes the rinsing fluid used for the rinsing operation of the treated components.

Therefore, the polluted rinsing fluid must necessarily be filtered in order not to pollute the aquifer as well. Furthermore, such rinsing fluid is difficult to reuse for the subsequent rinsing operations, since also in this case long and complicated filtering operations are necessary.

Even if a biodegradable and eco-compatible soluble material is used, there could still be the risk that the large quantity of rinsing fluid to be continuously changed could cause disposal problems.

A further drawback lies in the fact that the first protection element used, given its solubility in contact with the rinsing fluid, may not be recycled and reused in subsequent finishing operations, thus entailing the use of always new protection elements at each finishing of the frame.

DISCLOSURE OF THE INVENTION

Under this situation, the problem underlying the present invention is that of eliminating the drawbacks of the prior art mentioned above, providing a protective cap for surface treatments on eyeglass frames portions and a method for the surface treatment of an eyeglass frame portion, which allow the efficiency of the surface treatments of the frame to be kept substantially constant over time.

A further object of the present invention is to provide a protective cap and a method which have a reduced environmental impact.

A further object of the present invention is to provide a protective cap which may be recycled and reused several times.

A further object of the present invention is to provide a method which allows recovery of the rinsing fluid.

A further object of the present invention is to provide a protective cap and a method, which allow not to pollute the foreseen rinsing fluid used in the tumbling and/or polishing steps.

A further object of the present invention is to provide a protective cap and a method which allow to selectively finish different areas of eyeglass frames avoiding the use of manual operations.

A further object of the present invention is to provide a protective cap which is constructively simple to manufacture.

BRIEF DESCRIPTION OF THE DRAWINGS

The technical features of the invention, according to the aforesaid aims, and its advantages, will become more readily apparent in the detailed description that follows, made with reference to the accompanying drawings, which illustrate a preferred embodiment, which is purely exemplary and not limiting, in which:

FIG. 6 shows a top plan view of the protective cap of FIG. 4;

FIG. 7 shows a sectional view of the protective cap of FIG. 6, taken along line VII-VII of FIG. 6;

FIG. 8 shows a sectional view of the protective cap of FIG. 6, taken along line VIII-VIII of FIG. 6.

DETAILED DESCRIPTION OF A PREFERRED EMBODIMENT EXAMPLE

Figure 1A:
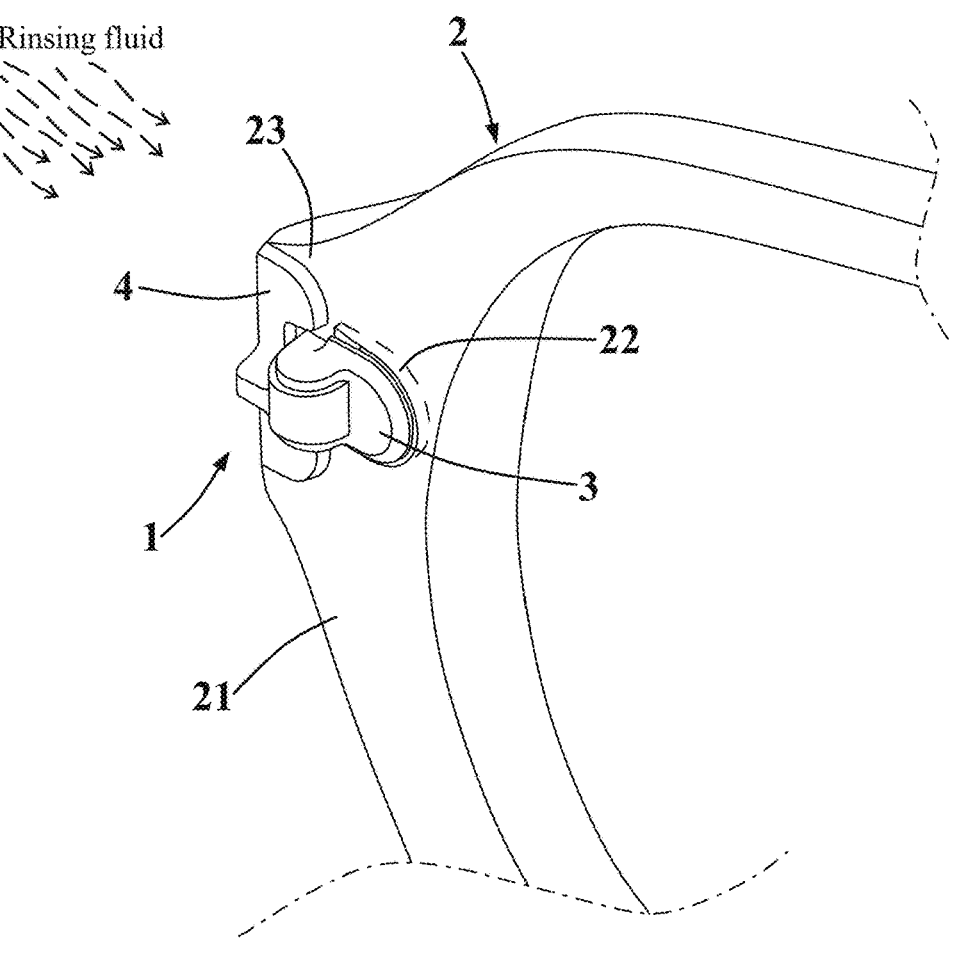
FIG. 1A shows a perspective view of an eyeglass frame portion and of a protective cap according to the invention mounted to the frame portion relating to a front, according to a first embodiment variant of the protective cap.

With reference to the accompanying drawings, reference numeral 1 indicates as a whole the protective cap object of the present invention.

The protective cap 1 is advantageously intended to be mechanically associated with a portion of an eyeglass frame 2 to protect it during surface treatments, in particular finishing treatments, which are carried out on the frame 2 preferably before the assembly of an eyeglass. In more detail, the aforementioned surface treatments comprise, in a per se known manner, at least a first surface treatment (known in technical jargon by the term roughing) and at least a second surface treatment (known in technical jargon by the term polishing tumbling), which are intended to eliminate production defects (such as for example burrs deriving from the production process) and advantageously to give the frame 2 a smooth surface finish. Preferably, a rinsing step is interposed between the aforementioned tumbling and polishing surface treatments, in which the portions of frame 2 are rinsed with a rinsing fluid (schematically indicated in FIG. 1A) to wash off the residues of the first surface treatment.

In more detail, the aforementioned rinsing fluid is a rinsing liquid, in particular a water-based liquid (for example water or a solution of water and surfactant).

Hereinafter, the expression "frame portion" will mean a part of a frame for glasses, for example made of acetate, which comprises at least one from between a temple 20 and a front 21, and at least one hinge element 22, which is fixed to the temple 20 or to the front 21.

In more detail below, reference will be made to a first embodiment variant in which the frame portion 2 comprises a front of the eyeglasses 21 and two hinge elements 22, which are fixed (for example by riveting or embedding) to the front 21, preferably at a heel 23 of the front 21 itself.

Figure 1B:
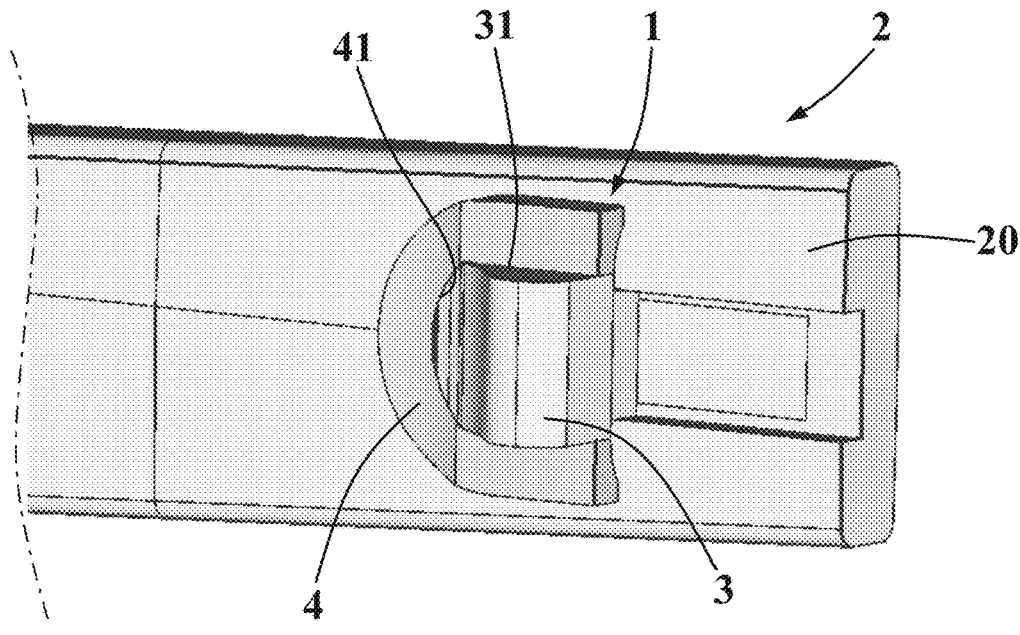
FIG. 1B shows a perspective view of an eyeglass frame portion and of a protective cap according to the invention mounted to the frame portion relating to a temple, according to a second embodiment variant of the protective cap.

According to a second embodiment variant, illustrated in FIG. 1B, the hinge element 22 is fixed to the temple 20, at an end portion thereof, facing the heel 23 when the temple 20 is mounted to the front 21.

In more detail, according to the aforementioned first embodiment variant, illustrated in FIG. 1A, at least one hinge element 22 is provided with a fastening portion 221 arranged to be fixed to the front 21 of the frame 2.

Figure 2:
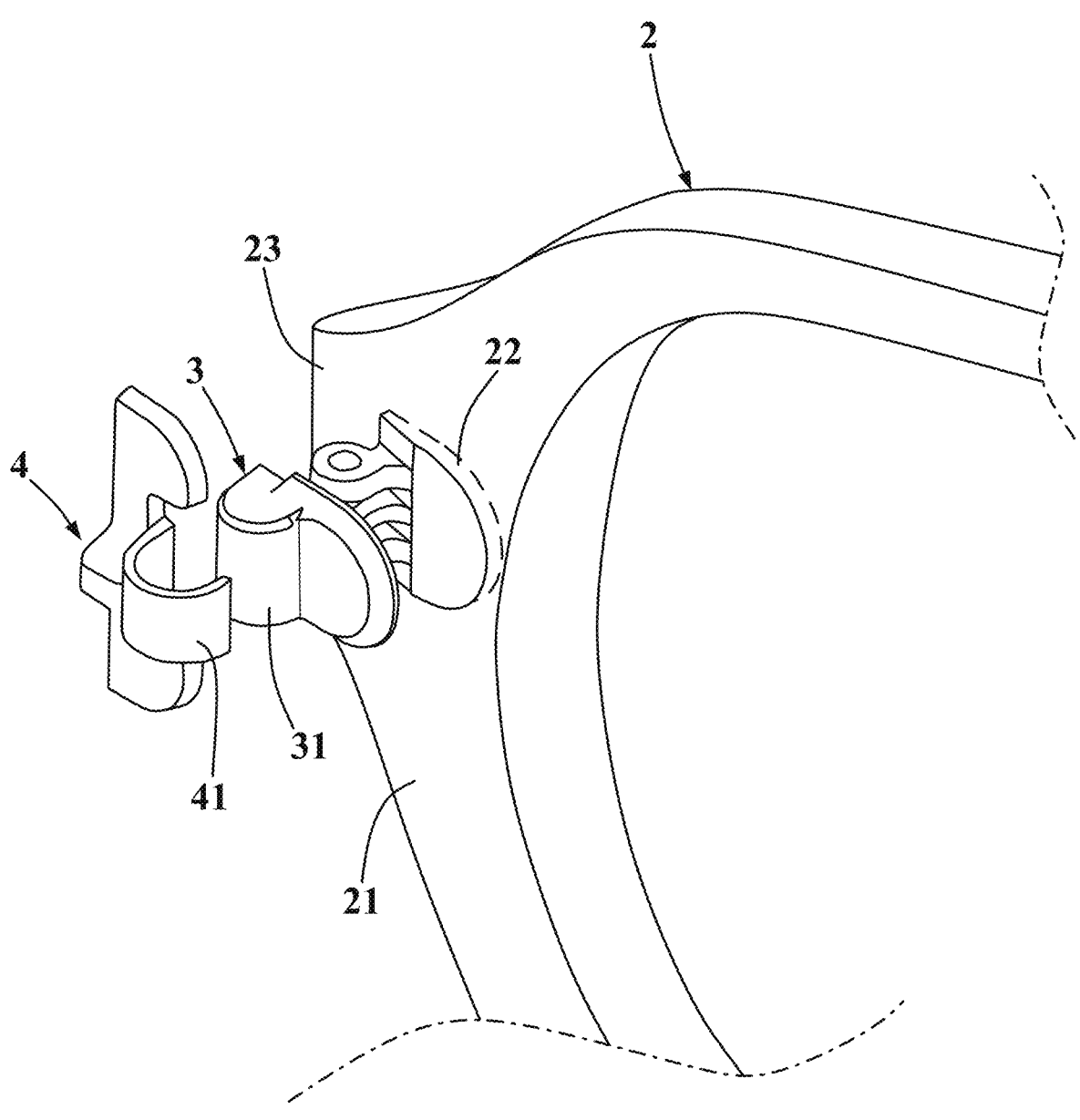
FIG. 2 shows a perspective view of the frame portion and of the protective cap of FIG. 1A with the protective cap illustrated in an exploded view.
Figure 3:
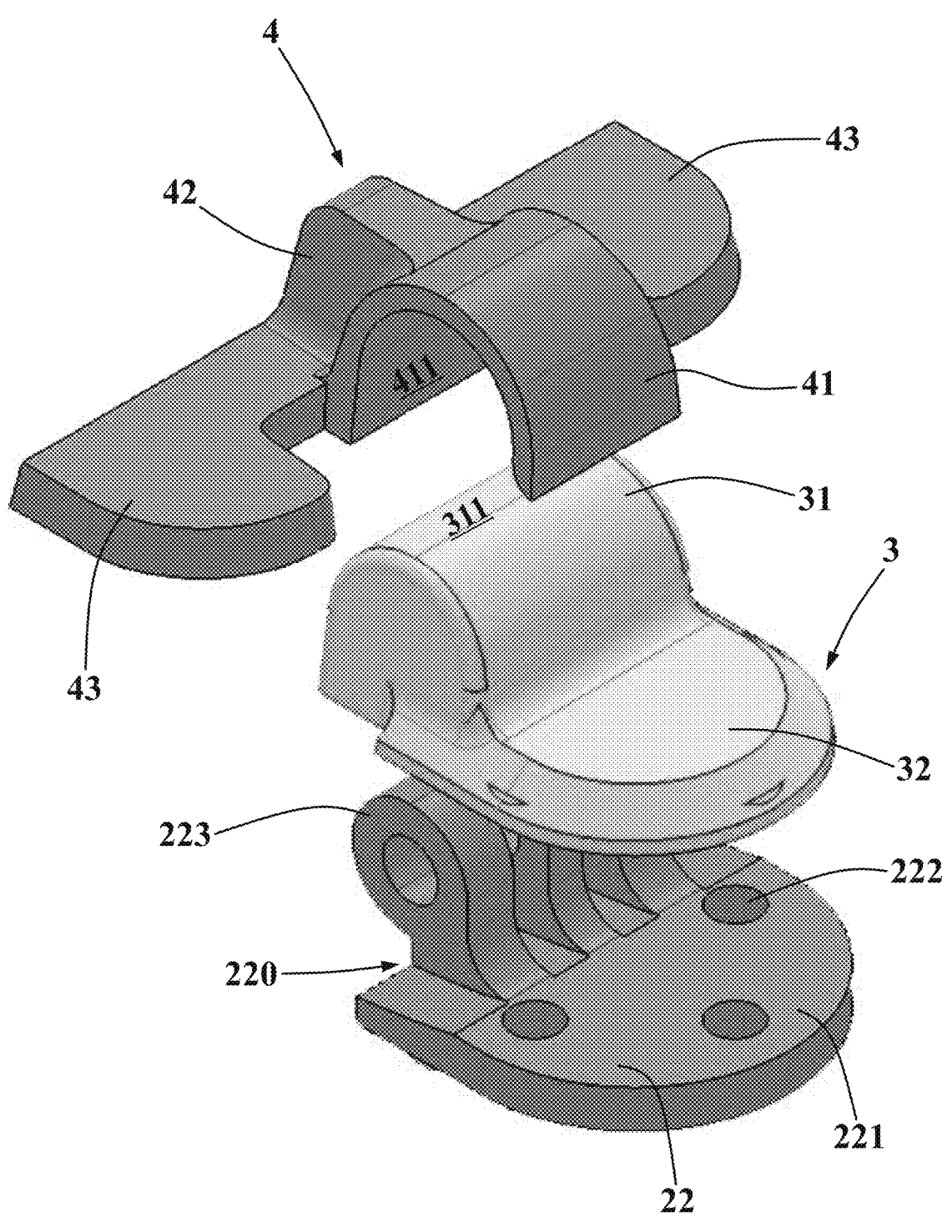
FIG. 3 shows a detail of FIG. 2 relating to the protective cap and to a hinge element shown in exploded view.
Figure 4:
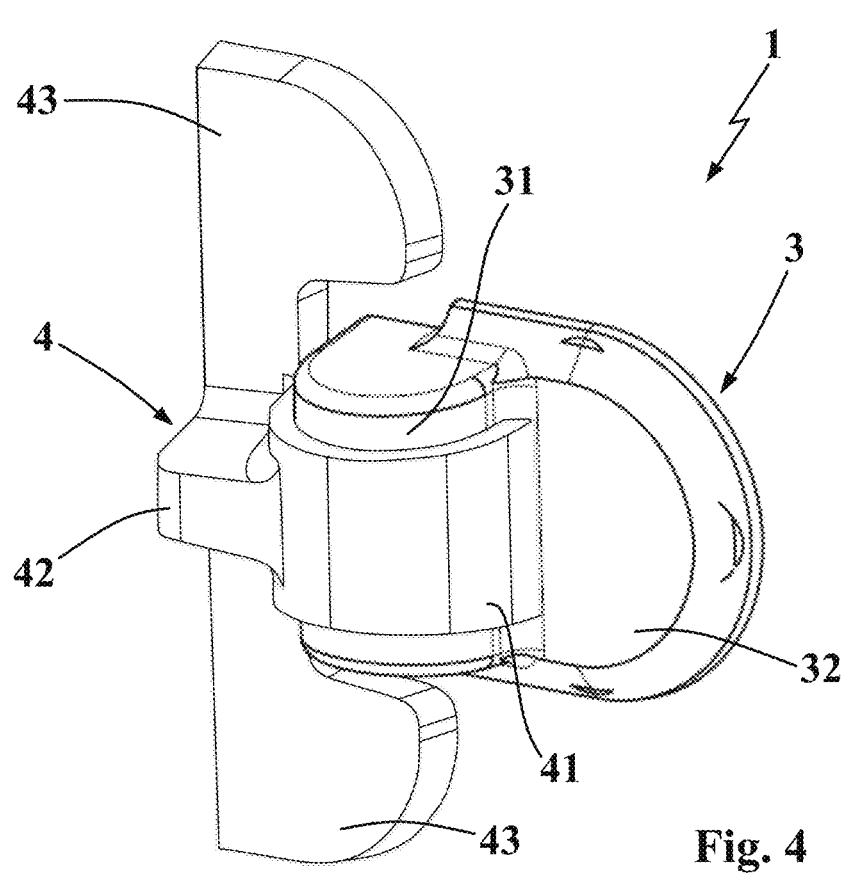
FIG. 4 shows a perspective view of the protective cap of FIG. 1A.

For example, the hinge element 22 is of the type to be riveted, as shown in the accompanying FIGS. 1-3, and the fastening portion 221 is provided with a substantially planar-shaped fastening plate. In particular, the fastening portion 221 is provided with at least two through holes 222 for fastening to the front 21 by means of fastening elements, such as for example rivets, not shown.

Furthermore, the hinge element 22 advantageously comprises a hinge portion 220, extending from the fastening portion 221 and comprising at least one hinge eye 223.

According to an embodiment variant not shown, the hinge element 22 is of the type to be embedded, therefore provided with a fastening portion 221 at least partially incorporated by embedding in the temple 20 or in the front 21.

Of course, without departing from the scope of protection of the invention, the hinge element 22 may be of any other shape and type.

The protective cap 1 according to the present invention comprises at least one first protection element 3, which is provided with a first coupling portion 31 and is intended to be mounted to cover a hinge element 22, in order to protect it during the above surface treatments.

Advantageously, the first protection element 3 is shaped so as to at least partially cover a visible surface of the hinge element 22 to prevent this visible surface from coming into contact with abrasive agents used during surface treatments.

According to the embodiment illustrated in the accompanying figures, the first protection element 3 comprises a covering portion 32, preferably substantially planar, which may be placed to cover the fastening portion 221 of the hinge element 22, and extends from the coupling portion 31, which may advantageously be placed to cover the hinge portion 220 of the hinge element 22.

Advantageously, as illustrated in FIG. 8, the covering portion 32 of the first protection element 3 comprises at least one hooking pin 320, which is capable of engaging at least one through hole 222 of the fastening portion 221 of the hinge element 22.

Advantageously, moreover, at least the first coupling portion 31 of the first protection element 3 defines a housing cavity, which is open at the bottom to fit the protection element 3 on the hinge element 22, in particular on the hinging portion 220 of the hinge element 22.

Of course, without thereby departing from the scope of protection of the present patent, in the event that the hinge element 22 is a hinge to be embedded, the first protection element 3 may comprise only the coupling portion 31 intended to be placed to cover of the hinge portion 220 of the hinge element 22.

Furthermore, the protective cap comprises at least a second protection element 4, which is provided with a second coupling portion 41, mechanically and removably connected to the first coupling portion 31 of the first protection element 3, and is intended to be mounted to cover of a surface area of the corresponding between the temple 20 and the front 21, adjacent to the hinge element 22 to protect it at least during the surface treatments, preferably at least during the tumbling surface treatment.

Preferably, the second protection element 4 is placed to cover the heel 23 of the front 21.

Advantageously, according to the first embodiment variant, the second protection element 4 is shaped so as to cover a surface area of the front 21, and preferably the heel 23, adjacent to the hinge element 22.

According to the second embodiment, in which the frame portion comprises a temple 20 and the hinge element 22 is fixed to the temple 20 itself, the second protection element 4 is shaped so as to cover a surface area of the temple 20, preferably at a portion of the rod arranged around the hinge 22, as better illustrated in FIG. 1B.

In more detail, the second protection element 4 comprises a second coupling portion 41 and a support element 42 which extends from the second coupling portion 41, preferably from a central area of the second coupling portion 41, in the opposite direction to the first protection element 3.

Advantageously, the second protection element 4 also comprises a pair of covering wings 43, which project from opposite sides of the support element 42 and are preferably planar to cover the surface area to be protected, in particular of the temple 20 or of the heel 23 of the front 21.

According to the idea underlying the present invention, at least the first coupling portion 31 of the first protection element 3 is made of a first material, preferably polymer, provided with a first swelling S1. Furthermore, at least the second coupling portion 41 of the second protection element 4 is made of a second material, preferably polymer, provided with a second swelling S2, which is different from the first swelling S1 of the first material. Furthermore, the second protection element 4 is intended to separate from the first protection element 3 due to the differentiated swelling following the absorption, preferably also differentiated, of the rinsing fluid.

Preferably, the second swelling S2 of the second material is greater than the first swelling S1 of the first material. In this way, the second material, in which at least the second coupling portion 41 is made, is advantageously configured to absorb, during the rinsing step, a greater quantity of rinsing fluid than the first material with which at least the first coupling portion 31 is made and, as a result of this differentiated absorption, at least the second coupling portion 41 is susceptible to deform, and in particular to swell, to a greater extent than the first coupling portion 31, resulting in the separation of the second protection element 4 from the first protection element 3.

In more detail, the expression "swelling" S means the ability of the material to swell, or to increase its volume, following the absorption of a liquid, in particular the rinsing fluid. Advantageously, such swelling S is measured as the quantity (expressed in % by weight) of rinsing fluid absorbed by the material under the process conditions under which the rinsing step is carried out. Preferably, the swelling S is therefore measured in the temperature and time intervals relating to the rinsing step.

Therefore, the swelling S is advantageously obtained with the following formula:

$$S(\%)=[(Ws-Wd)/Wd]*100 \qquad \text{(formula 1)}$$

where S is the swelling, Ws is the mass of the material after swelling and Wd is the mass of the material before swelling.

In particular, this measurement is obviously valid for materials which swell, or increase their volume, following the absorption of liquid, in particular rinsing fluid.

For materials which maintain a substantially unchanged volume also following the absorption of the rinsing fluid, a swelling S equal to zero will therefore preferably be understood.

Preferably, in the case of a water-based rinsing fluid (for example comprising water or a solution of water and a surfactant), the swelling S is measured at a temperature of between 30° C. and 70° C., and preferably between 30° C. and 50° C. for a time of between 5 and 30 min.

According to the preferred embodiment, the second material of which at least the second coupling portion 41 is made has a second swelling S2 greater than 17%, and preferably of between 17% and 50%, so to absorb the rinsing fluid in an amount greater than 17% and preferably of between 17% and 50% of its own weight.

Advantageously, the second material is a polymer with additives in order to increase the second swelling S2 of the second material.

In particular, the second material advantageously comprises at least one matrix formed by at least one hydrophilic polymer and at least one plasticizing agent.

Preferably, the hydrophilic polymer is selected from polyvinyl alcohol (PVA) and polylactic acid (PLA).

Preferably, the plasticizing agent is a polyol. Preferably, the plasticizing agent is selected from glycerol, pentaerythritol and glycols with a molecular weight greater than 200 g/mol (for example polyethylene glycol).

Advantageously, moreover, the second material comprises at least one additive, which may comprise at least one of a reinforcing filler, an inorganic filler, an organic additive.

Of course, the additive may also comprise a combination of one or more of the above additives. Preferably, the reinforcing filler is of the inorganic type and in the form of nanoparticles, fibers or nanotubes, and is for example functionalized silica.

Preferably, the inorganic filler is selected from phyllosilicates (for example montmorillonite or bentonite), anionic clays (for example hydrotalcite) and metal salts (for example sodium sulfate). In particular, the inorganic filler is advantageously introduced to improve the stability of the second material, decreasing the risk that the latter is dissolved by the rinsing fluid.

Preferably, the organic additive is selected from water-retaining polymeric materials (for example potassium polyacrylate, sodium polyacrylate, hydroxyethylcellulose) and stearates (for example calcium).

Advantageously, the second swelling S2 of the second material is at least 2% greater than the first swelling S1 of the first material.

Advantageously, the ratio between the first swelling S1 of the first material and the second swelling S2 of the second material is of between 0.4 and 0.8, and is preferably equal to about 0.6.

In this way, the swelling difference is such as to allow the detachment between the first protection element 3 and the second protection element 4.

For this purpose, the first material of which at least the first coupling portion 31 is made is advantageously provided with a first swelling S1 lower than 15% and preferably between 2% and 15%, to absorb the rinsing fluid in an amount between 2% and 15% of its own weight.

In particular, the first material is advantageously of the polymer type, preferably polyamide.

According to a further embodiment variant, at least the first coupling portion 31 of the first protection element 3 is made of a substantially non-absorbent material, in particular hydrophobic (for example in the case of rinsing fluid comprising water), which has a first swelling S1 less than 1%, such as for example a ceramic or metallic material, or a low absorption polymer material.

According to the preferred embodiment, illustrated in the accompanying figures, the protection element 3 is made in a single body and in particular it is made entirely of the first material.

Furthermore, the second protection element 4 is preferably made in a single body and in particular it is made entirely of the second material.

According to the aforementioned embodiment, therefore, the entire second protection element 4 in the second material is capable of absorbing, in contact with the rinsing fluid, a quantity of rinsing fluid greater than the quantity of rinsing fluid which the first protection element 3 in the first material is capable of absorbing. In this way, this differentiated absorption causes a differentiated swelling between the first and second protection element 3, 4, and in particular between the first and second coupling portion 31, 41, which advantageously allows the mechanical detachment between the first coupling portion 31 and the second coupling portion 41.

Of course, without thereby departing from the scope of protection of the present patent, it is also possible to make the first coupling portion 31 in the first material and the remaining part of the first protection element 3 in a different material, even a hydrophobic or water-repellent material, and advantageously make the second coupling portion 41 in the second material and the remaining part of the second protection element 4 in a different material, also a hydrophobic or water-repellent material, in an equivalent manner.

Advantageously, the first coupling portion 31 and the second coupling portion 41 are substantially counter-shaped and coupled by means of shape relationship. In this way, the first coupling portion 31 and the second coupling portion 41 are advantageously configured to detach when they swell differently following the differentiated absorption of the rinsing fluid.

Figure 5:
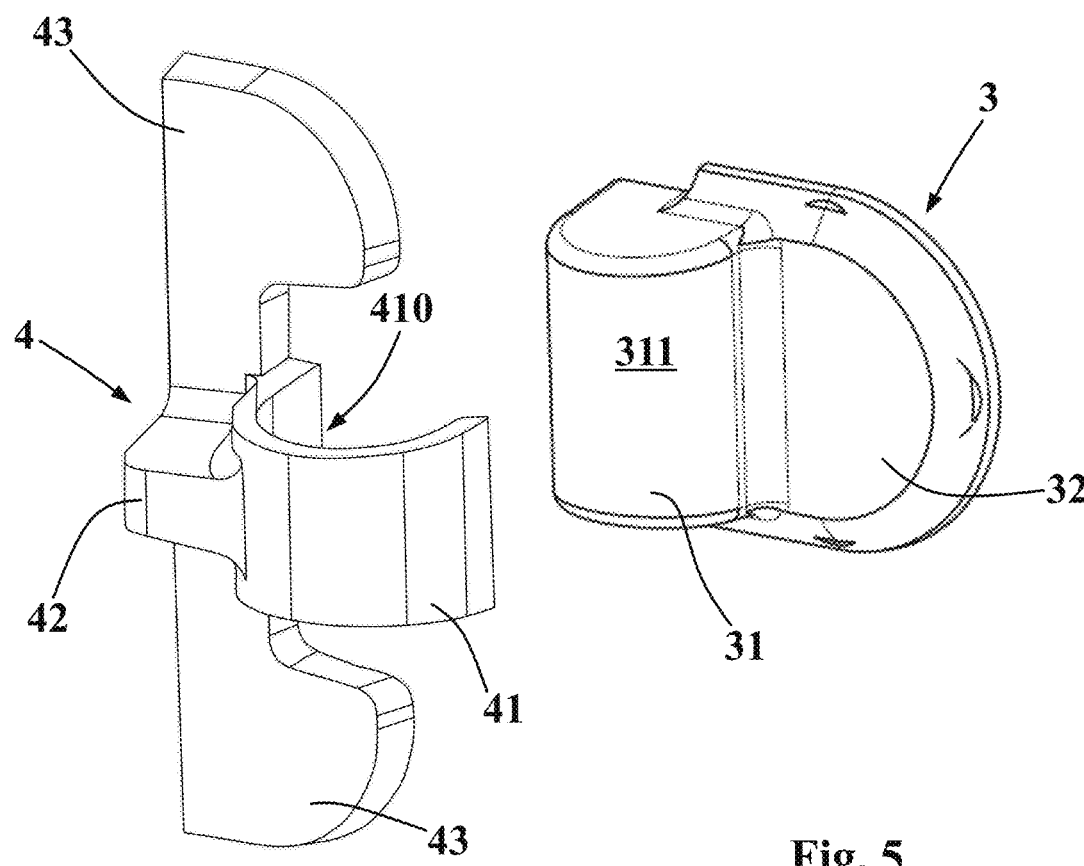
FIG. 5 shows a perspective view of the protective cap of FIG. 4 shown in exploded view.

According to the preferred embodiment, illustrated in particular in FIGS. 3 and 5, the first coupling portion 31 is provided with a first convex coupling surface 311 and the second coupling portion 41 is provided with a second concave coupling surface 411 placed to cover at least partially the coupling surface 311 of the first coupling portion 31.

In more detail, the first coupling surface 311 of the first coupling portion 31 has a substantially semi-cylindrical shape and faces the second protection element 4.

Advantageously, moreover, the second coupling portion 41 is provided with a coupling seat 410 defined by the second coupling surface 411, which faces the first protection element 3 and at least partially houses the first coupling portion 31.

Preferably, the second coupling surface 411 is arranged in abutment against the first coupling surface 311.

Preferably, moreover, the entire coupling portion 41 is U-shaped. In particular, the second coupling portion 41 is arranged to partially envelop the first coupling portion 31, so that the second coupling portion 41 is placed externally to the first coupling portion 31 and is therefore free to swell by detaching itself from the first coupling portion 31.

Of course, without thereby departing from the scope of protection of the invention, it is possible to provide a different shape coupling between the first and second coupling portion 31, 41, for example by providing the coupling portions 31, 41 with a cylindrical shape, spherical shape or any other shape suitable for the purpose. Furthermore, it is also possible that the second coupling portion 41 is convex and the first coupling portion 31 is concave and arranged to at least partially cover the second coupling portion 41, in the opposite manner to what has been described above. Operatively, according to this last embodiment variant, the second coupling portion 41, following the differentiated absorption of the rinsing fluid, swells by exerting a pressure on the first coupling portion 31 and consequently causing the deformation of the first coupling portion 31 and the detachment of the coupling portions 31, 41 and therefore of the protection elements 3, 4 from each other.

Advantageously, the second protection element 4 is overprinted on the first protection element 3, to improve the adhesion between the two protection elements 3, 4.

Advantageously, the first protection element 3 and the second protection element 4, in particular the two materials of the protection elements 3, 4, are chemically coupled by means of a hydrolyzable covalent bond, which is preferably arranged to be hydrolyzed in contact with the rinsing fluid.

In more detail, the covalent bond is formed between the first coupling portion 31 and the second coupling portion 41 and in particular between the first coupling surface 311 of the first protection element 3 and the second coupling surface 411 of the second protection element 4 in contact with each other.

For this purpose, at least one of the first and second materials of which at least the coupling portions 31, 41 of the protection elements 3, 4 are made comprises at least one functional coupling group, preferably a functional group selected from amino group (—NH$_2$) and alcohol group (—OH), and the other of the first and second materials comprises a coupling agent, which is arranged to chemically bind to the functional coupling group.

Preferably, the first or second material comprising the coupling agent is functionalized with the aforementioned coupling group, i.e. it comprises a reactive functional group which acts as a coupling agent.

The expression "coupling agent" is therefore to be understood as any chemical substance capable of forming, during the production of the protective cap 1, covalent bonds between the first and second materials, in particular with the functional coupling group.

In more detail, the protective cap 1 is made by a reactive molding process, such as for example a reactive extrusion or a reactive injection molding, to form the aforementioned covalent bond between the coupling agent of one of the two protection elements 3, 4 and the corresponding functional coupling group present in the material of the other protection element 3, 4.

Advantageously, the coupling agent comprises maleic anhydride and/or an epoxide.

According to the preferred embodiment, the second material comprises the coupling agent.

Advantageously, moreover, the first material is a polyamide (for example PA 66) comprising as functional coupling group at least one amino functional group (—NH$_2$) capable of forming a covalent bond with the coupling agent of the second material.

According to a different embodiment, apart from the examples given above, a different technical solution to the drawbacks of the prior art is defined below which provides that the first protection element 3 and the second protection element 4 are chemically coupled by a hydrolyzable covalent bond. In particular, this embodiment is independent of whether the protection elements 3, 4 have a different swelling, i.e. the protection elements 3, 4 may have the same swelling or may not swell at all. Advantageously, the protection elements 3, 4 are substantially insoluble in the rinsing fluid.

In this case, advantageously the two protection elements 3, 4 detach by hydrolysis of the aforementioned bond in contact with the rinsing fluid, as described above.

However, this different embodiment may provide what has been described above with reference for example to the features of the hydrolyzable bond, the coupling agent and/or the shape of the protective cap 1 and therefore will not be further described below.

The object of the present invention is also a method for the surface treatment of a portion of eyeglass frame 2, for which the same reference numerals used above will be maintained for greater explanatory clarity.

According to the invention, the method comprises a step for preparing a portion of eyeglass frame 2 provided with at least one of a temple 20 and a front 21, and at least one hinge element 22, fixed to one of the temple 20 and the front 21, and preferably to the heel 23 of the front 21.

Preferably, the portion of frame 2 is of the type described above.

Furthermore, the surface treatment method comprises a step of preparing a protective cap 1, which comprises at least a first protection element 3, provided with a first coupling portion 31, wherein at least the first coupling portion 31 is made of a first material.

Furthermore, the preparation step of the protective cap 1 provides for the preparation of at least one second protection element 4, provided with a second coupling portion 41, mechanically and removably connected to the first coupling portion 31 of the first protection element 3, wherein at least the second coupling portion 41 is made of a second material.

Advantageously, the protective cap 1 is of the type described above.

The method also comprises a step for assembling the protective cap 1 on the front 21 of the frame 2 with the first protection element 3 covering the hinge element 22 and with the second protection element 4 covering a surface area of the temple 20 or of the front 21, preferably at the heel 23, adjacent to the hinge element 22.

Advantageously, the assembly step provides for arranging the first protection element 3 with the first coupling portion 31 arranged to cover the hinge portion 220 of the hinge element 22 and with the covering portion 32 arranged to cover the fastening portion 221 of the hinge element 22.

Advantageously, moreover, the assembly step provides for arranging the second protection element 4 with the covering wings 43 arranged to cover the surface portion of the corresponding between the temple 20 and the front 21.

According to the invention, the method provides for a step of first surface treatment of the portion of frame 2, advantageously performed using first abrasive agents.

Preferably, the first abrasive agents are of the coarse type to substantially carry out a roughing process.

Furthermore, the method provides for a step of second surface treatment of the portion of frame 2, advantageously performed using second abrasive agents.

Preferably, the second abrasive agents are finer-grained than the first abrasive agents, to provide a surface finishing treatment.

The first and second surface treatment steps are per se known in the field and therefore will not be described in more detail.

The method also provides, preferably between the first and second surface treatment steps, a rinsing step of the portion of frame 2 by means of a rinsing fluid, to advantageously eliminate processing residues left after the first surface treatment.

According to the idea underlying the present invention, during the rinsing step the second polymer material of the second coupling portion 41 of the second protection element 4 undergoes expansion, preferably swelling, due to at least partial absorption of the rinsing fluid, and following the expansion it separates from the first protection element 3 and from the portion of frame 2.

In more detail, the first material of which at least the first coupling portion 31 is made, swells following the absorption of a first quantity of rinsing fluid, increasing its volume with a first expansion. Furthermore, the second material of which the second coupling portion 41 is made absorbs a second quantity of rinsing fluid, increasing its volume with a second expansion.

Preferably, the first and second expansion are different and in particular the second expansion of the second material (and of the second coupling portion 41) is greater than the first expansion of the first material (and of the first coupling portion 31).

In particular, the expressions "first expansion" and "second expansion" are to be understood as the volume variations ($\Delta V$) following the absorption of the first coupling portion 31 and the second coupling portion 41, respectively.

Of course, without thereby departing from the scope of protection of the invention, the first expansion and/or the first quantity of rinsing fluid absorbed by the first material may be zero.

Advantageously, the second amount of rinsing fluid absorbed by the second material is greater than the first amount of rinsing fluid absorbed by the first material of which the first coupling portion 31 is made.

Advantageously, at least the second expansion is substantially proportional to the second quantity of rinsing fluid absorbed and may therefore be quantified with a swelling S as expressed above.

Therefore, this difference in absorption of the rinsing fluid between the two coupling portions 31, 41 advantageously causes a different expansion, or swelling, of the two coupling portions 31, 41. In more detail, following the greater absorption of the second coupling portion 41, this swells more, detaching itself from the first coupling portion 31. Advantageously, the first and second protection elements 3, 4 are coupled mechanically (by shape engagement) and chemically as described above.

In more detail, the preparation step of the protective cap 1 provides for the creation of the first protection element 3 and the second protection element 4 chemically coupled by means of a hydrolyzable covalent bond, which is advantageously arranged to be hydrolyzed in contact with the rinsing fluid.

Advantageously, therefore, during the rinsing step the aforementioned covalent bond between the first and second protection element 3, 4, in contact with the rinsing fluid, is hydrolyzed and the second protection element 4 separates from the first protection element 3 (and therefore from the portion of the eyeglass frame 2). Advantageously, the rinsing fluid causes both the chemical detachment by hydrolysis of the covalent bond between the two coupling portions 31, 41 and the mechanical detachment by swelling of the second coupling portion 41.

According to a different embodiment, apart from the examples given above, a different technical solution to the drawbacks of the prior art is defined below which provides that the step of arranging the protective cap 1 provides for the creation of the first protection element 3 and the second protection element 4 chemically coupled by a hydrolyzable covalent bond. In particular, this embodiment is independent of whether the protection elements 3, 4 have a different swelling, i.e. the protection elements 3, 4 may have the same swelling or may not swell at all.

In this case, advantageously during the rinsing step the aforementioned covalent bond between the first and second protection element 3, 4, in contact with the rinsing fluid, is hydrolyzed and the second protection element 4 separates from the first protection element 3, as described above.

However, this different embodiment may include the process steps described above and/or below and will therefore not be described further.

According to the preferred embodiment, the rinsing fluid used in the rinsing step is water-based, comprising water or a solution of water and surfactants.

Advantageously, the rinsing fluid is at a temperature of between 30° C. and 70° C., and preferably between 30° C. and 50° C.

According to any one of the described embodiments, the second material of which at least the second coupling portion 41 is made is advantageously substantially insoluble in the rinsing fluid (for example insoluble in water-based liquids, in particular not water-soluble), in particular at the process temperatures described above, so as to allow both the second protection element 4 and the rinsing fluid to be recycled.

Advantageously, in order to accelerate the absorption of the rinsing fluid by the second material, and to reduce the duration of the rinsing step, the emission of ultrasounds inside the rinsing bath is provided in this step.

Advantageously, the ultrasounds are arranged to intercept the protective cap 1, favoring the absorption of the rinsing fluid by the second material.

Advantageously, moreover, the ultrasound emission continues for the entire duration of the rinsing step.

According to an embodiment, the protective cap 1 was made using Nylon as the first material and as the second material a material comprising a polymer matrix of polyvinyl alcohol (PVA) and glycerol, and an additive comprising calcium stearate and reinforcing fillers consisting of functionalized silica. According to the aforementioned embodiment, the first swelling S1 of the first material is about 9% while the second swelling S2 of the second material is about 24% (measured as a percentage of its own absorbed weight).

The aforementioned values were obtained by means of a swelling test carried out by immersing the first and second material in water at 45° C. for 14 min and simultaneously applying ultrasound.

The protective cap 1 was injection molded and used in a processing method as described above. It was therefore observed that following the rinsing step, the second protection element 4 detaches from the first protection element 3 and from the portion of frame 2, leaving the surface of the heel 23 uncovered for the second surface treatment step.

The invention thus conceived therefore achieves the intended objects.

The contents of the Italian patent application number 102022000006500, from which this application claims priority, are incorporated herein by reference.

The invention claimed is:

1. A protective cap for surface treatments on eyeglass frame portions of the type comprising:

at least one from between a temple and a front; and at least one hinge element-fixed to said at least one from between said temple and said front;

said protective cap comprising:

at least one first protection element, which is provided with a first coupling portion and is intended to be mounted to cover said hinge element, in order to protect said hinge element during surface treatments;

at least one second protection element, which is provided with a second coupling portion, mechanically and removably connected to the first coupling portion of said first protection element, and is intended to be mounted to cover a surface zone of said at least one from between said temple and said front, adjacent to said hinge element in order to protect said hinge element during said surface treatments;

wherein at least the first coupling portion of said first protection element is made of a first polymer material provided with a first swelling, and at least the second coupling portion of said second protection element is made of a second polymer material, provided with a second swelling, wherein said second swelling is greater than said first swelling, said second protection element being intended to be separated from said first protection element due to different swelling following the absorption of a rinsing fluid, wherein said second polymer material is insoluble in said rinsing fluid.

2. The protective cap of claim 1, wherein the second swelling of the second polymer material, constituting at least the second coupling portion, is greater than 17%.

3. The protective cap of claim 1, wherein the second swelling of the second polymer material is comprised between 17% and 50%.

4. The protective cap of claim 1, wherein said second protection element is overprinted on said first protection element.

5. The protective cap of claim 1, wherein said first protection element and said second protection element are chemically coupled by means of a covalent bond hydrolyzable via contact with said rinsing fluid.

6. The protective cap of claim 1, wherein the first coupling portion and the second coupling portion are substantially counter-shaped, and coupled by means of shape relationship.

7. The protective cap of claim 6, wherein the first coupling portion of said first protection element is provided with a convex coupling surface, and the second coupling portion of said second protection element is provided with a second concave coupling surface placed to at least partially cover the convex coupling surface of said first coupling portion.

8. The protective cap of claim 1, wherein the second polymer material comprises:

at least one matrix formed by at least one hydrophilic polymer and at least one plasticizing agent;

at least one additive.

9. A method for the surface treatment of an eyeglass frame portion, said method comprising:

arranging an eyeglass frame portion provided with at least one from between a temple and a front, and at least one hinge element fixed to said at least one from between said temple and said front;

arranging a protective cap comprising:

at least one first protection element, provided with a first coupling portion, wherein at least said first coupling portion is made of a first polymer material provided with a first swelling;

at least one second protection element, provided with a second coupling portion, mechanically and removably connected to the first coupling portion of said first protection element, wherein at least said second coupling portion is made of a second polymer material provided with a second swelling; wherein said second swelling is greater than said first swelling;

mounting said protective cap on the frame portion with said first protection element covering said hinge element and said second protection element covering a surface zone of said at least one from between said temple and said front, adjacent to said hinge element;

a first surface treatment of said frame portion;

rinsing said frame portion by means of a rinsing fluid;

a second surface treatment of said frame portion;

wherein, during said rinsing, the second polymer material of the second coupling portion of said second protection element undergoes an expansion via at least partial absorption of said rinsing fluid, and following said expansion is separated from said first protection element and from said frame portion, wherein said second polymer material is substantially insoluble in said rinsing fluid.

10. The method of claim 9, wherein said first protection element and said second protection element are chemically coupled by means of a hydrolyzable covalent bond, which during said rinsing is hydrolyzed by said rinsing fluid in order to separate said second protection element from said first protection element.

11. The method of claim 9, wherein said rinsing is attained by means of said rinsing fluid at a temperature comprised between 30° C. and 70° C.

12. The method of claim 9, wherein said rinsing is attained by means of said rinsing fluid at a temperature comprised between 30° C. and 50° C.

* * * * *